United States Patent
Sohm et al.

(10) Patent No.: US 8,881,114 B2
(45) Date of Patent: Nov. 4, 2014

(54) STORED PROGRAM WRITING STALL INFORMATION WHEN A PROCESSOR STALLS WAITING FOR ANOTHER PROCESSOR

(75) Inventors: Oliver P. Sohm, Toronto (CA); Brian Cruickshank, Oakville (CA); Manisha Agarwala, Richardson, TX (US); Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2669 days.

(21) Appl. No.: 11/383,469

(22) Filed: May 15, 2006

(65) Prior Publication Data
US 2006/0259831 A1  Nov. 16, 2006

Related U.S. Application Data (60) Provisional application No. 60/681,427, filed on May 16, 2005, provisional application No. 60/681,542, filed on May 16, 2005, provisional application No. 60/681,561, filed on May 16, 2005.

(51) Int. Cl.
*G06F 9/44* (2006.01)

(52) U.S. Cl.
USPC ........................................................ 717/128

(58) Field of Classification Search
USPC ........... 717/124–128; 711/141–148; 718/102; 710/241, 260; 714/27–28, 45, 30–34, 714/724; 709/213; 455/561
See application file for complete search history.

(56) References Cited

U.S. PATENT DOCUMENTS

| | | | |
|---|---|---|---|
| 6,567,932 B2 * | 5/2003 | Edwards et al. | 714/30 |
| 7,058,855 B2 * | 6/2006 | Rohfleisch et al. | 714/28 |
| 7,058,859 B2 * | 6/2006 | McCullough et al. | 714/45 |
| 7,062,587 B2 * | 6/2006 | Zaidi et al. | 710/305 |
| 7,080,289 B2 * | 7/2006 | Swaine et al. | 714/45 |
| 7,401,333 B2 * | 7/2008 | Vandeweerd | 718/102 |
| 7,444,546 B2 * | 10/2008 | Kimelman et al. | 714/31 |
| 7,519,879 B2 * | 4/2009 | Woodward et al. | 714/724 |
| 7,526,679 B2 * | 4/2009 | So et al. | 714/31 |
| 7,565,576 B2 * | 7/2009 | Seroff | 714/27 |
| 2005/0198422 A1 * | 9/2005 | Galbraith et al. | 710/260 |
| 2005/0229043 A1 * | 10/2005 | Nasuti et al. | 714/38 |

* cited by examiner

*Primary Examiner* — Tuan A Vu
(74) *Attorney, Agent, or Firm* — Lawrence J. Bassuk; Frederick J. Telecky, Jr.

(57) ABSTRACT

A method and system of inserting marker values used to correlate trace data as between processor cores. At least some of the illustrative embodiments are integrated circuit devices comprising a first processor core, a first data collection portion coupled to the first processor core and configured to gather data comprising addresses of instructions executed by the first processor core, a second processor core communicatively coupled to the first processor core, and a second data collection portion coupled to the first processor core and configured to gather data comprising addresses of instructions executed by the second processor core. The integrated circuit device is configured to insert marker values into the data of the first and second processor cores which allow correlation of the data such that contemporaneously executed instruction are identifiable.

4 Claims, 5 Drawing Sheets

```
00008568  00008000                NOP
0000856C  040403E2                MVC.S2    CSR,B8
00008570  000000AB                MVK.S2    0x0001,B0
00008574  02A3CF5A    ||          AND.L2    -2,B8,B5
00008578  009403A2                MVC.S2    B5,CSR
0000857C  22903224        [ B0]   LDB.D1T1  *++A4[0x1],A5      L1D RM, WB Flush, 0x12345678, 10 stalls
00008580  02900942                MV.D2     B4,B5
00008584  03946CA2                SHL.S2    B5,0x3,B7
00008588  029CBA42                ADDAH.D2  B7,B5,B5
0000858C  0294B1E2                ADD.S2X   B5,A5,B5
00008590  018428C1                ZERO.D1   A3
00008594  00800943                MV.D2     B0,B1
00008598  031401E0                ADD.S1    A0,A5,A6
0000859C  41982214        [ B1]   LDBU.D1T1 *++A6[0x1],A3      Crosspath, 1 stall
000085A0  00006000                NOP       4
000085A4  0298A843                ADD.D2    B6,B5,B5
000085A8  008C87A0                AND.S1    4,A3,A1
000085AC  22140943        [ B0]   MV.D2     B5,B4
000085B0  900425E2        [!A1]   ZERO.S2   B0                 L1P MISS, 8 stalls; B1=1
000085B4  2FFFFF91        [ B0]   B.S1      0x859C
000085B8  22903224        [ B0]   LDB.D1T1  *++A4[0x1],A5
000085BC  00000000                NOP                          DMA completion int; B0=0
```

FIG. 7

| # | PA | Disas | | | RT... | RS |
|---|---|---|---|---|---|---|
| | | Processor Core 30 | | | | |
| #0 | | | | | | |
| #21 | 00008D10 | B.S1 | | 0x00c580 | 27 | |
| #22 | 00008D14 | MVK.S1 | | 0x21cc,A4 | 28 | |
| #23 | 00008D18 | ADDKPC.S2 | | RL14 (PC+3... | 29 | |
| #24 | 00008B18 | ADDKPC.S2 | | RL14 (PC+3... | 30 | |
| #25 | 00008D18 | ADDKPC.S2 | | RL14 (PC+3... | 31 | |
| #26 | 00008D1C | MVKH.S1 | | 0x0000, A4 | 32 | |
| #27 | 0000C5BD | OR.D1 | | 0,A4,A9 | 33 | PcStop |TimingS |
| #28 | 0000C584 | OR.D2 | \|\| | 0,B3,B9 | 34 | |
| #29 | 0000C588 | NOP | \|\| | | 35 | PcStart |PcStop |
| #30 | 00008D20 | LDW.D2T2 | | *+​+B15[2],B3 | 36 | PcStart |TimingS |
| #31 | 00008CF0 | BNOP.S1 | | L3 (PC-28... | 37 | |
| #32 | 00008CF0 | BNOP.S1 | | L3 (PC-28... | 38 | |
| #33 | 00008CF0 | BNOP.S1 | | L3 (PC-28... | 39 | 90 |
| #34 | 00008CF0 | BNOP.S1 | | L3 (PC-28... | 40 | |
| #35 | 00008CF0 | BNOP.S1 | | L3 (PC-28... | 41 | |
| #36 | 00008CF0 | BNOP.S1 | | L3 (PC-28... | | |
| #37 | 00008CC4 | B.S1 | | 0x00d420 | | |

Receiver stopped (eStoppedFull)   Samples=11183   time from start: 0.0002 ms
Ready

| # | PA | Disas | | RT... | RS |
|---|---|---|---|---|---|
| | | Processor Core 32 | | | |
| | 00008CC4 | B.S1 | 0x00d420 | 0 | PcStart |TimingStart |
| | 00008CC8 | MVK.S1 | 0x2911,A3 | 1 | |
| | 00008CCC | MVKH.S1 | 0x0000,A3 | 2 | PipelineStall |
| | 00008CCC | MVKH.S1 | 0x0000,A3 | 8 | |
| | 00008CD0 | STW.D2T1 | A3,*+B15[1] | 9 | |
| | 00008CD4 | ADDKPC.S2 | RL11 (PC+3... | 10 | |
| | 00008CD8 | STW.D2T2 | B10,*+B15[2] | 11 | |
| | 00008CDC | OR.D1 | 0,A11,A4 | 12 | PcStop |TimingStop |
| | 0000D420 | B.S2 | LOG_F_even... | 13 | PcStart |TimingStart |
| | 00008CE0 | B.S1 | 0x00d180 | 14 | |
| | 00008CE4 | ADDKPC.S2 | RL12 (PC+1... | 15 | |
| | 00008CE4 | ADDKPC.S2 | RL12 (PC+1... | 16 | |
| | 00008CE8 | OR.D1 | 0,A10,A4 | 17 | |
| | 00008CEC | OR.D2 | 0,B11,B4 | 18 | PipelineStall |
| | 00008CEC | OR.D2 | 0,B11,B4 | 24 | |

Sample 9340   Samples=.831

1

STORED PROGRAM WRITING STALL INFORMATION WHEN A PROCESSOR STALLS WAITING FOR ANOTHER PROCESSOR

CROSS-REFERENCE TO RELATED APPLICATIONS

This application claims the benefit of Provisional Application Ser. No. 60/681,427 filed May 16, 2005, titled "Debugging Software-Controlled Cache Coherence," Provisional Application Ser. No. 60/681,542, filed May 16, 2005, titled "Debug Profiling Applications," and Provisional Application Ser. No. 60/681,561 filed May 16, 2005, titled "Debugging Applications with Overlays, Run-Time Relocatable Code and Multi-Tasking," all of which are incorporated by reference herein as if reproduced in full below.

BACKGROUND

In order to look for errors in software programs (an activity referred to as "debugging"), some software development tools provide the ability to record the sequence of operations that a processor performed while executing a program. This is referred to as tracing the execution of the program, and the information that is captured is referred to as trace data The trace data may comprise data such as the sequence of operational codes (opcodes) executed by the processor, values of various processor registers at each executed opcode, and information in log files written by the traced program.

Some systems utilize multiple processor cores acting in concert to achieve their operational objectives. For example, a target system may comprise a digital signal processor core and an ARM core, where the two cores work together to perform various tasks. Having the multiple cores work together leads to situations where one processor core stalls waiting on the second processor core to complete prerequisite task (e.g., providing a piece of information or releasing a shared memory area). However, when debugging the software program it is difficult to correlate the code executed as between the processor cores to determine the activity of the second processor core that caused the stall of the first processor core.

SUMMARY

The problems noted above are solved in large part by a method and system of inserting marker values used to correlate trace data as between processor cores. At least some of the illustrative embodiments are integrated circuit devices comprising a first processor core, a first data collection portion coupled to the first processor core and configured to gather data comprising addresses of instructions executed by the first processor core, a second processor core communicatively coupled to the first processor core, and a second data collection portion coupled to the first processor core and configured to gather data comprising addresses of instructions executed by the second processor core. The integrated circuit device is configured to insert marker values into the data of the first and second processor cores which allow correlation of the data such that contemporaneously executed instruction are identifiable.

Other illustrative embodiments are a computer-readable medium comprising a program that, when executed by a processor, causes the processor to obtain data related to addresses of instructions executed by a first processor core of a target system, obtain data related to addresses of instructions executed by a second processor core of the target system, and correlate the data related to addresses of instruction executed by the first and second processor cores such that contemporaneously executed instructions are identifiable.

Yet still other illustrative embodiments are a computer-readable medium storing a program that, when executed by a first processor core, causes the first processor core to execute a series of instructions that rely in part on instructions executed in a second processor core, and write stall information to a predetermined location when the first processor core stalls waiting for the second processor core.

BRIEF DESCRIPTION OF THE DRAWINGS

For a detailed description of exemplary embodiments of the invention, reference will now be made to the accompanying drawings in which.

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
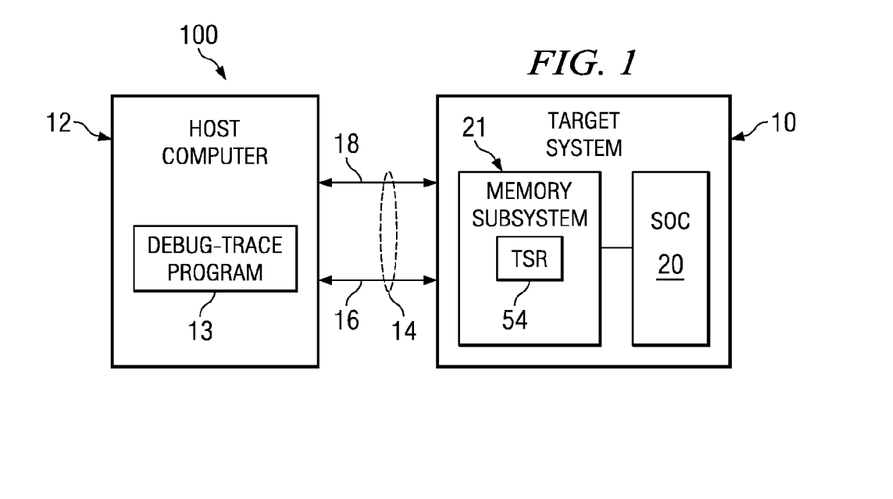
FIG. 1 shows a system in accordance with embodiments of the invention.

FIG. 1 illustrates a software development system 100 in accordance with embodiments of the invention. The software development system 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. In some embodiments, the host computer 12 stores and executes a program that is used for software debugging (e.g., gather trace data and produce trace displays), and thus is referred to herein as a software debugger program or a debug-trace program 13.

The host computer 12 and target system 10 couple by way of one or more interconnects 14, such as cables. In some embodiments, the host computer 12 couples to target system 10 by way of one or more multi-pin cables 16, such as a Mictor cable available from Tektronix Texas, LLC of Richardson, Tex. Each multi-pin cable 16 enables transfer of trace data files from a processor core the target system 10 to the host computer 12. In alternative embodiments, the host computer 12 couples to the target system 10 by way of one or more serial cables 18 across which the host computer 12 communicates with the joint test action group (JTAG) communication system, or other currently existing or after developed serial communication system. Serial communication between the host computer 12 and each processor core of the target system 10 on a serial cable 18 has lower bandwidth than a multi-pin connection through illustrative cable 16. Thus, in embodiments where it is not cost-effective to use trace to capture every event of a processor core within a particular time frame, the statistical sampling subsystem (discussed more fully below) of each processor core is configured to statistically sample pertinent data, and transfer the statistically sampled data across its respective serial cable 18. In yet still further alternative embodiments, the multi-pin cable 16 for a particular processor core may have two or more pins dedicated to serial communication, and thus the host computer 12 and each processor core of the target system 10 may communicate using multiple protocols, yet over the same multi-pin cable 16. In yet still other embodiments, interconnects between processor cores on the same integrated circuit enable one processor core to be the recipient of trace data, whether the trace data comprises all the events of a traced processor core or statistically sampled events of the traced processor core.

Figure 2:
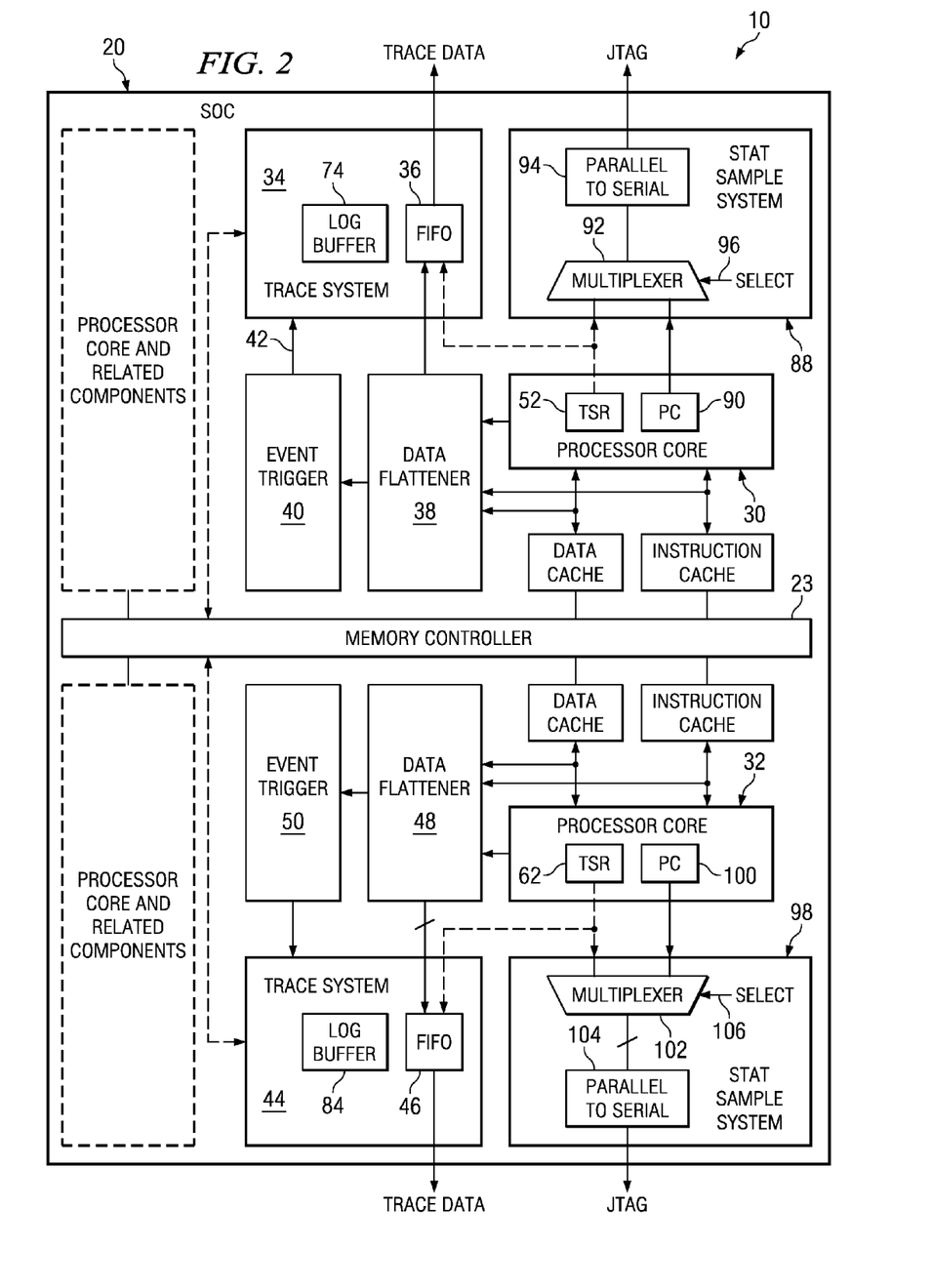
FIG. 2 shows, in greater detail, a target system in accordance with embodiments of the invention.

FIG. 2 shows in greater detail a portion of the target system 10. In particular, a target system 10 in accordance with at least some embodiments comprises a System-On-A-Chip (SOC) 20. The SOC 20 is so named because many devices that were previously individual components are integrated on a single integrated circuit. The SOC 20 in accordance with embodiments of the invention comprises multiple processor cores (e.g., processor cores 30 and 32) which may be, for example, digital signal processors, advanced reduced instruction set (RISC) machines (ARMs), a Very Long Instruction Word (VLIW) processors, video processors, and co-processors. Each processor core of the SOC 20 may have associated therewith various systems, but the various systems are shown only with respect to processor cores 30 and 32 so as not to unduly complicate the drawing. A memory controller 23 couples to each processor core. The memory controller 23 interfaces with external random access memory (RAM) (e.g., RAM 21 of FIG. 1), interfaces with RAM on the SOC 20 (if any), and facilitates message passing between the various processor cores. Attention now turns to the specific systems associated with at least some processor cores of an SOC 20.

The following discussion is directed to the various systems associated with processor core 30. The discussion of the various systems associated with processor core 30 is equally applicable to the processor core 32 and any other processor core on the SOC 20. In accordance with some embodiments, processor core 30 has associated therewith a trace system 34. The trace system 34 comprises a First In-First Out (FIFO) buffer 36 in which trace data is gathered. When operating in the trace mode the trace data is sent to the host computer 12 (FIG. 1) by the trace system 34. Because the processor core 30 may perform a plurality of parallel operations, in some embodiments the processor core 30 also couples to a data flattener system 38. As the name implies, the data flattener system 38 gathers the pertinent trace data from the processor core's execution pipeline, serializes or "flattens" the trace data so that events that execute at different stages in the pipeline are logged in the correct sequence, and forwards the trace data to the FIFO buffer 36 in the trace system 34. A non-limiting list of the various data points the data flattener system 38 may read, serialize and then provide to the FIFO buffer 36 is: direct memory access (DMA) trace data; cache memory trace data; addresses of opcodes executed by the processor 30; the value of hardware registers in the processor 30; and interrupts received by the processor 30.

Still referring to FIG. 2, in some embodiments processor core 30 may also couple to an event trigger system 40. The event trigger system 40 couples to the data flattener system 38 and receives a least a portion of the serialized data. In response to various pre-programmed triggers (where such triggers may be communicated to the event trigger system 40 by way of JTAG-based communications or programmed directly by the processor core itself), the event trigger system 40 asserts a trigger signal 42 to the trace system 34. In response, the trace system 34 accumulates trace data in its FIFO buffer 36 and sends the trace data to the host computer 12 (FIG. 1).

Referring simultaneously to FIGS. 1 and 2, a user of the host computer system 12 wishing to debug instructions of processor core 30 enables the event trigger system 40, possibly by JTAG-based communication over a serial cable 18. Thereafter, the user initiates the instructions on the processor core 30. The processor core 30 executes the instructions, while the data flattener system 38 gathers pertinent information, serializes the information, and forwards it both the event trigger system 40 and the trace system 34. At points in time before the trace system 34 is enabled by the event trigger system 40, the data supplied to the trace system 34 by the flattener 28 may be ignored, discarded or collected such that the trace data comprises events prior to the trigger. At a point in execution of the instructions, the trigger events occur and the trigger events are identified by the event trigger system 40. When the trigger events occur, the event trigger system 40 asserts the trigger signal 42 to the trace system 34.

In response to assertion of the trigger signal 42, the trace system 34 collects the trace data in the FIFO buffer 36 (possibly together with events that occur prior to the trigger). Simultaneously with collecting, the trace system 34 sends the trace data to the host computer 12. In embodiments where all or substantially all the events after the assertion of the trigger signal 42 are part of the trace data for the processor core 30, the trace system 34 sends the trace data over a relatively high bandwidth multi-pin cable 16. Other embodiments comprise sending the data over optical interconnect to the host computer, or logging the captured trace data in memory or disk that is accessible by the processor core 30 where it can be accessed by another program running on the processor core 30, for example by an embedded software debugging program.

As illustrated in FIG. 2, processor core 32 likewise has a trace system 44, FIFO buffer 46, data flattener system 38 and event trigger system 50. In accordance with embodiments of the invention, the trace system 34 (and related systems and components) associated with processor core 30 and the trace system 44 (and related systems and components) associated with processor core 32 may be simultaneously operational, each sending a separate stream of trace data to the host computer 12. Thus, the debug-trace program 13 of the host computer 12 may have trace data from each processor core of the SOC 20; however, the processor cores of the SOC 20 may operate at different clock frequencies, and may also operate on different instruction streams and data streams. In some cases, a first processor core may perform various tasks to assist a second processor core in completing an overall task. If a problem exists in the instruction stream for the first processor core, the second processor may stall waiting for the first processor core to complete an action (e.g., passing a result or releasing a shared memory location). When debugging in a situation where two or more processor cores are generating trace data, it is difficult to correlate the code executing as between the processor cores to determine which instructions the processor cores were contemporaneously executed. In the case of one processor core stalled waiting on another processor core to complete an activity, it is difficult from viewing only a list of addresses of executed instructions for each processor to determined what activity of the non-stalled processor core caused the stall of the other processor core.

In order to address this difficulty, and in accordance with some embodiments, the integrated circuit SOC 20 is configured to insert markers or marker values into the trace data of each processor core. The debug-trace program 13 (executing on the host computer 12 or as an embedded debugger) extracts the marker values from the trace data, which enable the debug-trace program to correlate the two sets of trace data to identify contemporaneously executed instructions. The following discussion is again directed to processor core 30 and its related systems, but the description is equally applicable to processor core 32 and its related systems, and any other processor core on the SOC 20. The illustrative trace system 34 obtains each marker value from a target state register (TSR). In some embodiments the target state register is a hardware register located within the processor 30, such as target state register 52. Although the hardware register version of the target state register 52 is shown to couple to the trace system 34 (by way of a dashed line), it will be understood that the value of the target state register may, in actuality, be supplied to the trace system after passing through the data flattener 38. A hardware register may be equivalently referred to as an opcode addressable register. In alternative embodiments, the target state register may be a register outside the processor. For example, and referring briefly to FIG. 1, the SOC 20 may couple to a memory subsystem 21 which implements the target state register 54. In these alternative embodiments, the target state register 54 may be readable by a memory operation to a predefined address within the processor core 30 address space, and thus target state register 54 may be referred to as a memory addressable register. In yet still other embodiments, the memory subsystem 21 may be integrated with other devices of the SOC 20. The trace system 34 is configured to send the value in the target state register 52, 54 to the debug-trace program 13 when the value in the target state register, or a portion thereof, is newly written.

Processor core 32 may correspondingly have: target state register 62 within the processor core 32 or a target state register in the memory subsystem 21; and a trace system 44 associated with processor core 32 which trace system 44 sends marker values in the TSR when newly written.

In embodiments where each trace system 34, 44 couples to the host computer 12 by way of the relatively high bandwidth connection, the trace systems 34, 44 are configured to monitor the marker values in their respective target state registers 52, 62 and send the marker values to the host computer system 12. In each case the trace systems 34, 44 send their respective marker values in a message wrapping protocol that identifies to the host computer 12 that the information is the marker from target state register 52, 62. Thus, in these embodiments the marker values in the target state registers are sent across high bandwidth cables (e.g., multi-pin cables 16) along with other trace data (e.g., direct memory access (DMA) trace data, cache memory trace data, addresses of opcodes executed by the processor core (the program counter values), the value of hardware registers in the processor core, and interrupts received by the processor core). The discussion now turns to various embodiments for writing the marker values to each target state register 52, 62.

In some embodiments, each processor core 30, 32 is configured to receive a periodic interrupt. In response to the periodic interrupt, each processor core is configured to load and execute an interrupt service routine which reads the marker value, and then writes the marker value to the target state register of its respective processor. In some embodiments, the interrupts are asserted to each processor 30, 32 substantially simultaneously. In alternative embodiments, the interrupts may be asynchronous with respect to each other, and in some cases may be asserted at different frequencies. In yet still other embodiments, portions of each operating system may be instrumented to write the marker values to the target state registers. For example, the dispatcher program of each operating system may be configured to write the marker value each time a new task is instantiated on its respective processor core. In yet still other embodiments, portions of a user program executing on each processor core may be instrumented to periodically write the marker values to the target state register. The discussion now turns to various embodiments for obtaining the marker values.

Figure 3:
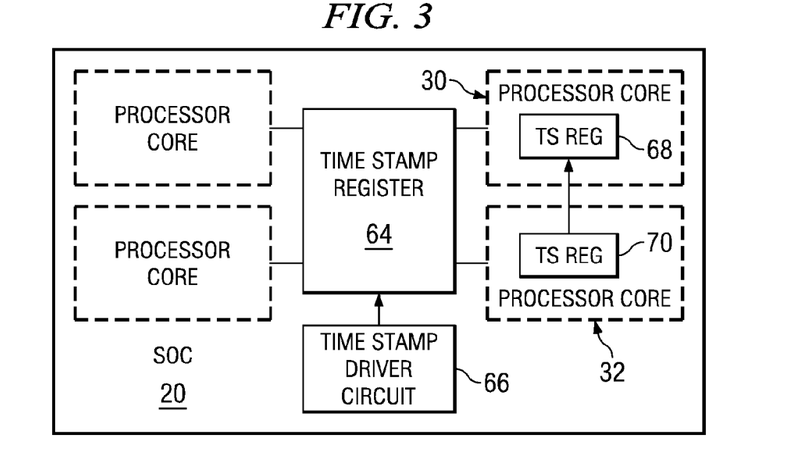
FIG. 3 shows a timestamp register in the target system in accordance with at at least some embodiments of the invention.

FIG. 3 illustrates a simplified version of the SOC 20 of FIG. 2, along with a timestamp register in accordance with some embodiments of the invention. In particular, FIG. 3 illustrates SOC 20 having a plurality of processor cores, with only processors cores 30 and 32 indicated with reference numbers. Each processor core couples to a timestamp register 64. In some embodiments, the timestamp register 64 is a hardware register, and in other embodiments the timestamp register 64 is a predetermined memory location in shared memory (either on the SOC, or in the external memory subsystem). In accordance with embodiments of the invention, the timestamp register contains the marker value, such as a free running counter value. Each processor core periodically reads the marker value from the timestamp register and inserts the marker value in its trace data stream by writing the marker value into its target state register. The debug-trace program 13 utilizes the marker values as the mechanism to correlate data such that contemporaneously executed instructions are identifiable.

In some embodiments, the SOC 20 comprises a timestamp driver circuit 66 which couples to the timestamp register 64, and periodically updates the marker value in the timestamp register atomically (i.e. in a non-interruptable manner). In other embodiments, one processor core of the SOC 20 is tasked with periodically updating the maker value held in the timestamp register. In embodiments where one processor core updates the marker value, the one processor core receives a periodic interrupt. The periodic interrupt instantiates an interrupt service routine which reads the marker value from the timestamp register 64, increments or decrements the marker value, and then atomically writes the new marker value to the timestamp register 64. Other systems and methods for updating the marker value in the timestamp register may be equivalently used.

FIG. 3 also illustrates alternative embodiments for each processor core obtaining the marker values. In particular, FIG. 3 illustrates each processor core 30 and 32 having timestamp register 68 and 70 respectively. One of the processor cores (e.g., processor core 32) is tasked with periodically updating the marker values in its timestamp register 70, writing the updated marker value to the timestamp register in the second processor core (e.g., processor core 30), and writing the updated marker value to the timestamp registers in other processor cores on the SOC 20.

Figure 4:
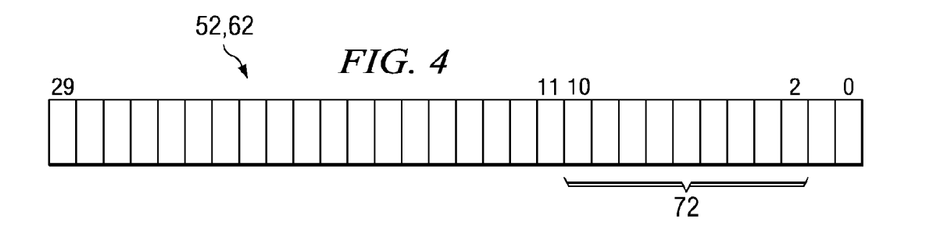
FIG. 4 shows a target state register in accordance with at least some embodiments.

The embodiments discussed to this point have assumed that the marker values fit within the number of bits of the target state registers 52, 62, and that the bits of the target state registers are not used for other purposes. In accordance with alternative embodiments, portions of the targets state registers 52, 62 are used for other purposes (e.g., identifying overlay programs used by each processor core), and thus the marker values may be constrained to a smaller portion of each target state register. FIG. 4 shows, at the bit level, the target state register 52, 62 in accordance with some embodiments of the invention. In particular, in order to differentiate marker values for other bits in the target state register, the bits of the target state register may be logically divided with one grouping of bits applicable to the marker values. For example, the grouping 72 (bits 2 through 10) may be the location where the processor core places the marker values. When the number of bits of the marker value becomes large, or where a majority of bits of the target state register are used for other information, alternative methods are used.

In order to address situations where the number of bits of the marker value becomes large, or where a majority of bits of the target state register are used for other information, in accordance with some embodiments each marker values is written to a log buffer. A log buffer may be equivalently referred to as a data table, data array and/or data structure. In some embodiments, the marker values the log buffer are read out by the debug-trace program after execution of the target or traced program has stopped. In situations where each log buffer does not contain a sufficient number of storage locations to store all the marker values written during a trace period (e.g., log buffer has too few locations, or the log buffer is circular and the number of entries expected will overwrite earlier entries during the trace period), each log buffer may be read by the host computer 12 one or more times during the trace period to ensure all the entries generated are available to the debug-trace program.

Referring again to FIG. 2, and using the various systems associated with processor core 30 as illustrative of other processors cores, in some embodiments the trace system 34, in addition to the FIFO buffer 36, implements a series of memory locations 74 to be the log buffer. In alternative embodiments, the log buffer is located in RAM, either on the SOC 20 or in the external memory subsystem (FIG. 1). Regardless of the precise location of the log buffer, the debug-trace program has access to the log buffer and can read data from the log buffer as described above. Likewise, trace system 44 has a log buffer 84 where the marker values may be placed. In cases where the log buffer can be read while the processor is running, the log buffer can be periodically read and emptied by the host computer so that the buffer size does not limit the amount of information that can be captured.

The logical construction of the log buffers may take many forms. In some embodiments, the log buffers are implemented as a plurality of equivalently sized data fields. In alternative embodiments, the log buffers are implemented as a plurality of arbitrary sized data fields. In yet still other embodiments, the log buffers are tables each having a plurality of rows and columns. Regardless of the logical construction of the log buffers, in accordance with embodiments of the invention each entry in the log buffer comprises the marker value and an index value. The index value is an index into the log buffer that identifies the location of the entry in the log buffer. The index value could be, for example, a pointer, packet number, sequence number, row number or any other value indicative of the location of the entry. In some embodiments, the index value is an inherent part of the entry, and in other embodiments the index value is generated and written when the marker value is written.

In addition to writing the marker value and possibly the index value in the log buffer 31, each processor core in accordance with embodiments of the invention also places its respective index value in the target state register 52, 62. Writing the index value to the target state register contemporaneously with writing the log buffer ensures that the index value is present in the trace data associated with the traced program. In accordance with some embodiments, the debug-trace program 13 in host computer 12 reads the index value from the trace data, indexes into the log buffer data based on the index value, and thus obtains the marker values. Thus, inserting marker values into the trace data stream comprises not only writing the marker values to the target state registers 52, 62 directly, but also writing the marker values to log buffers and placing index values in the target state registers 52, 62. Attention now turns to how the debug-trace program 13 uses marker values.

In overall software applications using multiple processor cores, one or more of the processors cores may cause other processor cores to stall, and thus slow overall system performance. Stalls can occur for a number of different reasons. For example, a general purpose processor may instruct a special-purpose coprocessor to perform a complex operation that the co-processor is optimized to implement. If a task that is running on the general purpose processor program needs the results of the coprocessor to be available before the general purpose processor can continue execution, the task is said to be stalled, or blocked. Contention over shared resources can also introduce stalls (e.g., systems that use an arbitration mechanism to share a memory device or peripheral can cause one processor to be stalled while another processor accesses the memory device). Other examples comprise one processor core waiting for a response from another processor core through an inter-processor communication mechanism (queues, flags, FIFOs, etc.). While the first processor core waits for the second processor core to respond, the first processor core is said to be stalled. Still other examples comprise one processor core waiting for another processor core to come out of a power-down situation or to finish booting after being reprogrammed. A debug-trace program in accordance with embodiments of the invention uses the marker values, and other information, to help the user of the debug-trace program to navigate in the trace data to instructions executed in a non-stalled processor core that caused another processor core to stall. In particular, in accordance with embodiments of the invention when a task executing on a processor core stalls waiting for another processor core (e.g., waiting for the other processor core to provide a value or release a shared memory location), the stalled processor core is configured to write information to its respective target state register 52, 62 which assists the debug-trace program. More particularly still, when one processor core stalls waiting on another processor core, in some embodiments the stalled processor core is configured to write the marker value to the target state register as discussed above, along with its processor identification number, the processor identification number of the processor core on which it is waiting, and an indication that the processor core has stalled (hereinafter stall information). In some embodiments, when the stalled processor core is able again to make forward progress, the formerly stalled processor again writes stall information into the trace data, except in this case the stall information comprises the marker value and an indication that the stall condition has cleared. In alternative embodiments, some or all of the stall information may be written to a log buffer as discussed above.

Figure 5:
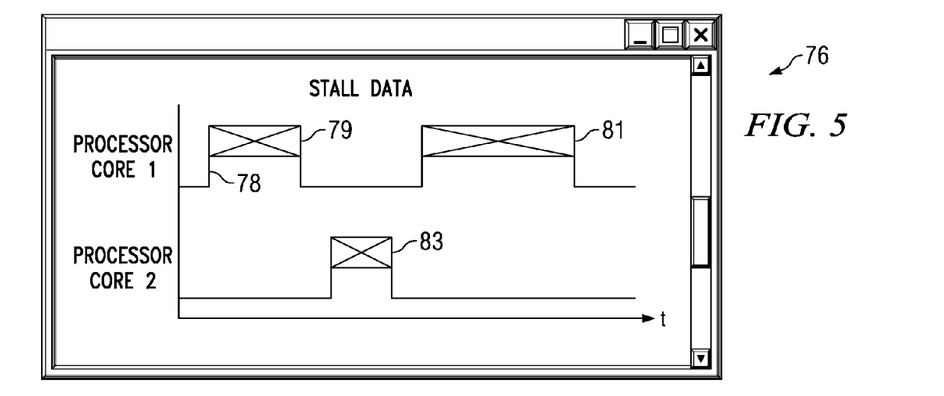
FIG. 5 shows a stall data screen in accordance with at least some embodiments of the invention.

The debug-trace program 13 uses the stall information to help the user of the debug-trace program navigate in the trace data to instructions executed in the processor core causing the stall. FIG. 5 shows an illustrative stall data screen 76 in accordance with some embodiments. In particular, the stall data screen shows a plurality of periods of time when a processor core was stalled (e.g., time periods 79, 81 and 83). For example, stall data screen 76 illustrates that "processor core 1" stalled twice during the time frame shown. The user may utilize the stall data screen 76 to index to trace data of the processor causing the stall. In some embodiments, a user of the debug-trace program selects a vertical line (e.g., vertical line 78). In response, the debug trace program reads the processor identification number of the processor causing the stall and the marker value. Using the processor identification number and the marker value, the debug trace program locates instructions executed by the non-stalled processor when the first processor stalled. In some embodiments, the debug-trace program displays the instructions of the non-stalled processor as trace data, such as trace data screen 80 illustrated in FIG. 6. The opcodes pertaining to each instruction may be determined by the debug-trace program 13 by correlating the addresses sent to the host computer 12 to object files of the traced program.

Figure 6:
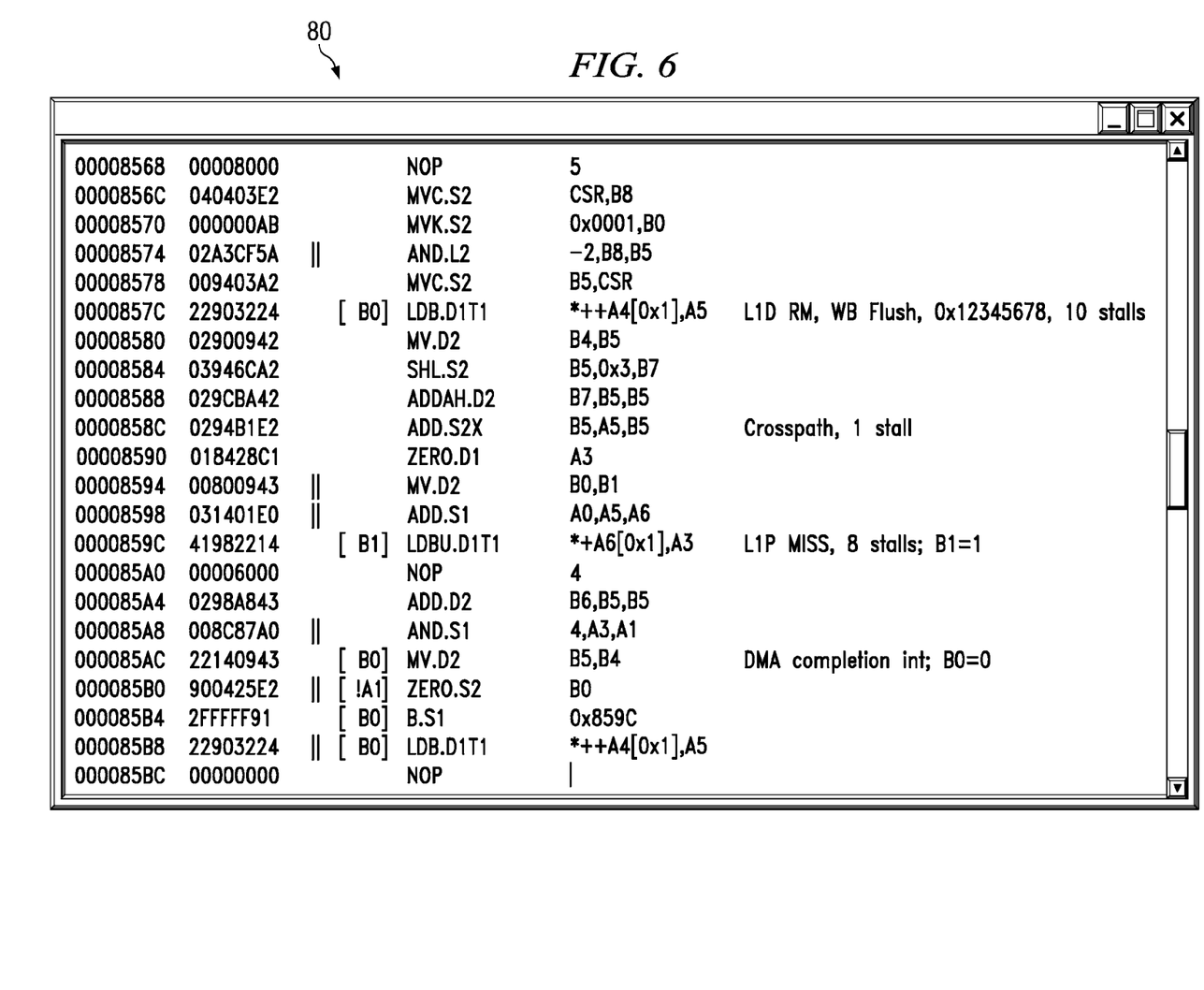
FIG. 6 shows a trace data screen in accordance with some embodiments of the invention.

FIG. 6 illustrates yet still other embodiments. In particular, FIG. 6 illustrates a trace data screen 86 where the debug-trace program displays a side-by-side view of trace data collected from multiple processor cores. Scrolling the vertical scroll bar 88 causes the trace data screen 90 for processor core 30 to move in a synchronized manner with the trace data screen 92 for processor core 32. The marker values written into the trace data streams for the processors cores 30, 32 are used to determine which trace instructions to display side-by-side for the two processors cores. To accommodate processors that are running at different clock rates or that may be periodically powered down, blank lines 94 or rows of pixels may be inserted into either data screen 90, 94 to preserve the synchronization.

Figure 8:
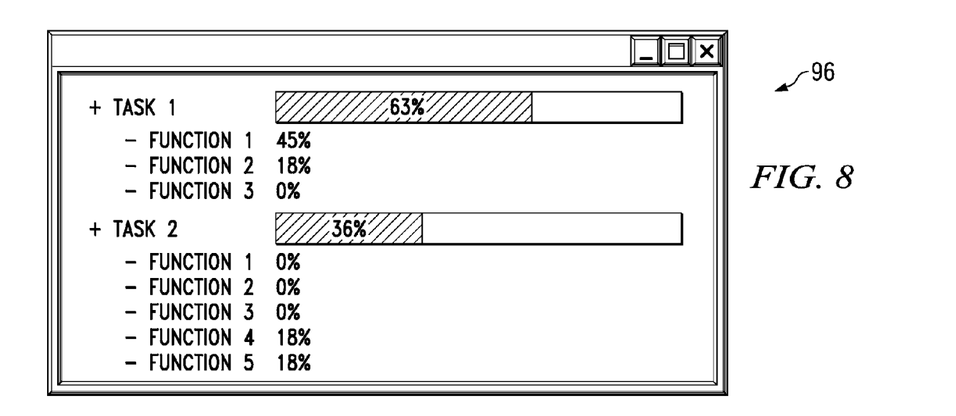
FIG. 8 shows profile screen in accordance with some embodiments of the invention.

In yet still other embodiments, the debug-trace program uses the stall information to display an indication of a proportion of an execution time of the non-stalled processor core dedicated to each task, which is termed herein "profiling." FIG. 8 illustrates a profiling screen 96 which shows the percentage of time the non-stalled processor core dedicated to each task during the stalled period of the stalled processor, the percentage shown in a bar graph form (with numerical equivalent embedded therein). The profiling screen 96 also shows that the percentage of time spent by each function within a task may also be displayed, in this case only by the numerical percentage. In alternative embodiments, all percentages may be shown as bar graphs with embedded numerical percentages, or just as numerical percentages. Thus, using the stall information, which comprises the marker values, the debug-trace program assists the user in finding and displaying (in various forms) the instructions executed by the processor core which caused the stall.

The embodiments discussed to this point utilize trace data gathered by the trace systems 34, 44; however, in alternative embodiments the SOC 20 either does not have the ability to gather all the pertinent trace data (e.g., a low cost SOC 20 that does not have the trace systems 34, 44, data flatteners 38, 48 and event trigger system 40, 50), or the user of the debug-trace program 13 is interested in a smaller subset of the data (possibly in close to real time). Referring again to FIG. 2, each processor core 30, 32 has associated therewith a statistical sample system 88, 98 respectively which enables the alternative embodiments to utilize a method termed herein "statistical profiling."

When statistical profiling, the statistical sample systems 88, 98 are configured to periodically read the value of their respective program counter (which contains the address of the next opcode to execute) from the program counter registers 90, 100 and send the values of the program counters to the debug-trace program. In order to send the stall information (comprising the marker values) to the host computer 12, the alternative embodiments send the value in the target state registers 52, 62 in place of the value of the program counters 90 100 when the values (or a portions thereof) in the target state register 52, 62 are newly written.

FIG. 2 illustrates that the statistical sample system 88 for processor core 30 comprises a multiplexer 92 and a parallel to serial converter 94. The statistical sample system 88 periodically reads a predetermined read address, in these embodiments the output signals of the multiplexer 92. The reading may be by a direct memory access (DMA) engine within the statistical sample system 88, or the DMA engine may be at some other location on the SOC 20. The value from the predetermined read address is provided to the parallel to serial converter 94, and from there is sent to the debug-trace program (e.g., over the serial cable 18). In some embodiments the statistical sample system 88 may be "programmed" to periodically read the predetermined memory location, and thus the debug-trace program from that point forward receives the read values without further commands. In alternative embodiments, the debug-trace program may make a request (or read) for each read value.

Still referring to FIG. 2, and with regard to the value in the target state register 52, the multiplexer 92 of the statistical sample system 88 is configured to provide to the predetermined read location the value of the program counter register 90, unless the value of the target state register 52 (or portion thereof) has changed since the last send of the value of the target state register. If the target state register 52 has been written since the last send of the value of the target state register 52 (e.g., processor core 30 has reached a stall condition, or a stall condition has cleared), then the multiplexer select signal 96 is asserted. On the next read of the predetermined memory address, the value of the target state register is present at the output of the multiplexer 92, and thus the host system is supplied the value of the target state register 52. After the read, but before the next read to the predetermined read address, the statistical sample system de-asserts the select signal 96. Processor core 32 correspondingly has statistical sample system 98 comprising a multiplexer 102, parallel to serial converter 104 and select signal 106, which operate similarly to those discussed with respect to processor core 30.

Differentiating the program counter value from the value of the target state register in the host computer 12 takes advantage of the fact that in accordance with at least some embodiments the target system 10 operates based on 16 bit (two byte) instructions aligned on even byte boundaries. Thus, the value of the program counter in accordance with these embodiments consistently has an even value, meaning that the least significant bit of the program counter is zero. In order to differentiate a program counter value from a value from the target state register, the least significant bit of the value of the target state register is assigned to be a logic "1". Other systems for differentiating program counter values from values of the target state register may be equivalently used.

Figure 7:
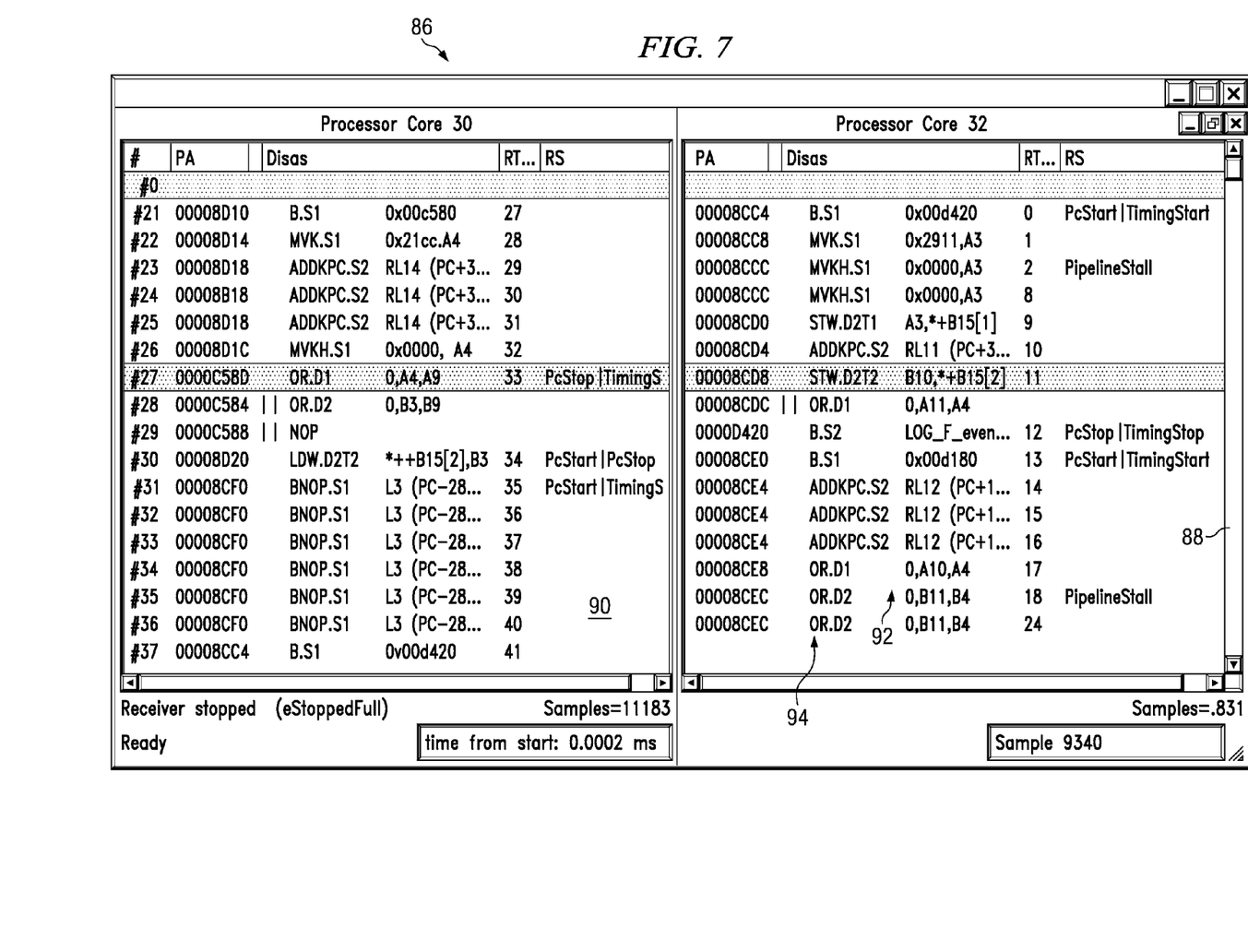
FIG. 7 shows a multi-processor trace data screen in accordance with some embodiments of the invention.

Using these tools, the host computer 12 (and in particular the debug-trace program 13) gets a statistical sample of values of each program counter, and each value of the target state registers 52, 62 during the executed program. From this information, the debug-trace program 13 assists the user in identifying executed instructions in the non-stalled processor, such as by building a display having an indication of a proportion of an execution time of the non-stalled processor core is dedicated to each task (and/or function within the task). Although not as exact as the embodiments where each executed address is captured, the embodiments performing statistically sampling still may generate and display indications, such as illustrated in FIG. 7.

Figure 9:
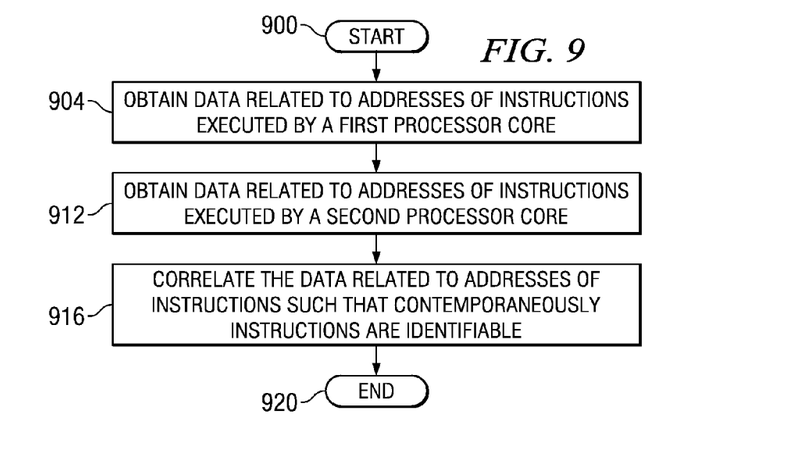
FIG. 9 shows a method in accordance with embodiments of the invention.

FIG. 9 illustrates a method (e.g., software) in accordance with embodiments of the invention. In particular, the process starts (block 900) and proceeds to obtaining data related to addresses of instructions executed by a first processor core (block 904). In some embodiments, the obtaining comprises obtaining in the form of trace data comprising substantially all executed instructions during the trace period. In alternative embodiments the addresses of the executed instructions are statistically sampled. Next, the illustrative method obtains data related to addresses of instructions executed by a second processor core (block 912). Like obtaining with respect to the first processor core, obtaining with respect to the second processor core may comprise obtaining in the form of trace data comprising substantially all executed instructions during the trace period, or statistically sampling the addresses of the executed instructions. Thereafter, the data related to the addresses of executed instructions are correlated such that contemporaneously executed instructions are identifiable (block 916) and the process ends (block 920). The correlation may take place by finding marker values in the trace data, and correlating based on the marker values. In some cases, the marker values are part of stall information written by a stalled processor. In other cases, the marker values are periodically written to the trace data to assist in identifying the contemporaneously executed instructions. One example of identifying contemporaneously executed instructions is identifying the instructions of a non-stalled processor core during a period of time when another processor core is stalled waiting on the non-stalled processor core to perform a task.

From the description provided herein, those skilled in the art are readily able to combine software created as described from the methods with appropriate general purpose or special purpose computer hardware to create a computer system and/or computer subcomponents embodying the invention, to create a computer system and/or computer subcomponents for carrying out the method of the invention, and/or to create a computer-readable medium for storing a software program to implement the method aspects of the invention. The computer-readable medium could be, for example, a volatile or non-volatile memory, a compact disc read only memory (CDROM), an electrically erasable programmable read only memory (EEPROM), a hard drive, and the like.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-readable, non-transitory medium storing a program that, when executed by a first processor core, causes the first processor core to:
   execute a series of instructions that rely in part on instructions executed in a second processor core; and
   write stall information to a predetermined location when the first processor core stalls waiting for the second processor core.

2. The computer-readable, non-transitory medium as defined in claim 1 wherein when the program causes the first processor core writes stall information the program causes the first processor core to write a marker value, an indication the first processor core has stalled, and an indication of the identity of the second processor core.

3. The computer-readable, non-transitory medium as defined in claim 2 wherein when the program causes the first processor core writes stall information the program causes the first processor core to write the marker value, the indication the first processor core has stalled, the indication of the identity of the second processor core, and an indication of the identity of the first processor core.

4. The computer-readable, non-transitory medium as defined in claim 1 wherein when the program causes the first processor core to write the stall information the program causes the first processor core to write the stall information to a predetermined register, which stall information is sent to a host computer either: with addresses of substantially all executed instructions of the first processor core; or with periodically sampled addresses of executed instructions of the first processor core.

* * * * *